US010284416B2

(12) United States Patent
Srinivasan (10) Patent No.: US 10,284,416 B2
(45) Date of Patent: May 7, 2019

(54) WORKLOAD DEPLOYMENT WITH INFRASTRUCTURE MANAGEMENT AGENT PROVISIONING (71) Applicant: Microsoft Technology Licensing, LLC, Redmond, WA (US)

(72) Inventor: Kattiganehalli Y. Srinivasan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/618,961

(22) Filed: Jun. 9, 2017

(65) Prior Publication Data
US 2017/0279655 A1 Sep. 28, 2017

Related U.S. Application Data (63) Continuation of application No. 13/712,657, filed on Dec. 12, 2012, now Pat. No. 9,712,375.

(51) Int. Cl.
*G06F 15/16* (2006.01)
*H04L 29/08* (2006.01)
(Continued)

(52) U.S. Cl.
CPC ........... *H04L 29/0872* (2013.01); *G06F 8/60* (2013.01); *G06F 9/45533* (2013.01); *H04L 41/0213* (2013.01)

(58) Field of Classification Search
CPC ...................................... G10L 15/22
(Continued)

(56) References Cited

U.S. PATENT DOCUMENTS 9,292,350 B1\* 3/2016 Pendharkar ........... G06F 9/5044
2009/0328030 A1 12/2009 Fries
(Continued)

FOREIGN PATENT DOCUMENTS

CN 102187315 A 9/2011
EP 2381363 A2 10/2011

OTHER PUBLICATIONS

U.S. Appl. No. 13/712,657, filed Dec. 12, 2012, Kattiganehalli Y. Srinivasan.
(Continued)

*Primary Examiner* — Hamza N Algibhah
(74) *Attorney, Agent, or Firm* — Ray Quinney & Nebeker, P.C.; James S. Bullough; Henry Gabryjelski (57) ABSTRACT A computer-implemented method for managing a workload in connection with a networked computing infrastructure having a plurality of host computer systems includes obtaining first data indicative of an environment type of the networked computing infrastructure, obtaining second data indicative of an operating system type of the workload, deploying, with a processor, an image of the workload in a virtual machine on a target host computer system of the plurality of host computer systems, incorporating a management agent of the networked computing infrastructure into the virtual machine to provision the virtual machine for operation within the networked computing infrastructure, the management agent being configured in accordance with the first data, and modifying launch instructions of the virtual machine in accordance with the second data such that the management agent is invoked during the operation of the virtual machine.

20 Claims, 4 Drawing Sheets (51) Int. Cl.
*H04L 12/24* (2006.01)
*G06F 8/60* (2018.01)
*G06F 9/455* (2018.01)

(58) Field of Classification Search
USPC .................................................... 709/224
See application file for complete search history.

(56) References Cited

U.S. PATENT DOCUMENTS

| | | | |
|---|---|---|---|
| 2010/0100862 A1 | 4/2010 | Ohtsuka | |
| 2010/0100892 A1 | 4/2010 | Fought et al. | |
| 2010/0257536 A1 | 10/2010 | Srinivasan | |
| 2011/0016473 A1 | 1/2011 | Srinivasan | |
| 2011/0035754 A1 | 2/2011 | Srinivasan | |
| 2011/0041126 A1 | 2/2011 | Levy et al. | |
| 2011/0126197 A1 | 5/2011 | Larsen et al. | |
| 2011/0246988 A1* | 10/2011 | Hui | G06F 9/45558 718/1 |
| 2012/0090016 A1* | 4/2012 | Savagaonkar | G06F 21/57 726/2 |
| 2012/0096149 A1 | 4/2012 | Sunkara et al. | |
| 2012/0117212 A1 | 5/2012 | Fries | |
| 2012/0151476 A1* | 6/2012 | Vincent | G06F 9/45558 718/1 |
| 2012/0204187 A1 | 8/2012 | Breiter et al. | |
| 2012/0222041 A1 | 8/2012 | Sabin et al. | |
| 2013/0191527 A1* | 7/2013 | Ashok | G06F 9/5072 709/224 |
| 2014/0019966 A1* | 1/2014 | Neuse | G06F 9/5077 718/1 |
| 2014/0075013 A1* | 3/2014 | Agrawal | G06F 11/3495 709/224 |
| 2015/0195372 A1* | 7/2015 | Zheng | H04W 4/18 709/217 |

OTHER PUBLICATIONS

"DaaS Mobility and Portability", Jul. 25, 2012, 5 pages, Retrieved at http://myvirtualcloud.net/?p=3599.

Deep Mann, "A Heterogeneous Workload Consolidation Technique for Green Cloud", Thesis, Jun. 2012, Computer Science and Engineering Department Thapar University.

International Search Report in PCT/US2013/074822, dated Mar. 20, 2014, 8 pages.

Mary Johnston Turner, "Dell AIM Delivers Automated Workload Mobility for Virtualization and Private Cloud", Nov. 2011, 8 pages, Retrieved at http://i.dell.com/sites/content/business/solutions/whitepapers/en/Documents/aim-idc-workload-mobility-virtcloud.pdf.

Steve Alexander, "Next-Gen Cloud Needs Data Center without Walls", May 30, 2012, 2 pages, Retrieved at https://www.wired.com/insights/2012/05/data-center-without-walls/.

"First Office Action and Search Report Issued in Chinese Patent Application No. 201380065053.5", dated Nov. 17, 2017, 14 Pages.

"Office Action Issued in European Application No. 13812448.2", dated Jun. 19, 2018, 7 Pages.

"Second Office Action Issued in Chinese Application No. 201380065053.5", dated May 15, 2018, 6 Pages.

Johnson, Eric B., "Microsoft System Center Virtual Machine Manager 2012 Storage Automation With the IBM XIV Storage System Gen3", (Feb. 2012), Retrieved from:http://www0.ibm.com/supportldocview.wss?uid=tss1wp102071&aid=1, Jun. 13, 2018, 46 Pages.

Juve, et al., "Automating Application Deployment in Infrastructure Clouds", In Proceedings of the IEEE Third International Conference on Cloud Computing Technology and Science, Nov. 29, 2011, pp. 658-665.

* cited by examiner

WORKLOAD DEPLOYMENT WITH INFRASTRUCTURE MANAGEMENT AGENT PROVISIONING

CROSS-REFERENCE TO RELATED APPLICATION

This application is a continuation application of co-pending U.S. patent application Ser. No. 13/712,657, entitled "Workload Deployment with Infrastructure Management Agent Provisioning" and filed on Dec. 12, 2012, the entire disclosure of which is hereby incorporated by reference.

BACKGROUND OF THE DISCLOSURE

Brief Description of Related Technology

Software systems are commonly used to create and run virtual computer systems, or virtual machines. Virtual machines are configured to run on a physical host computer system. A single physical host computer is often configured to support multiple virtual machines. Each virtual machine typically has a respective operating system to support the execution of software applications on the virtual machine.

Arrays of such physical host computers are commonly arranged in data centers to provide remote computing services. Data centers are typically used to provide cloud computing services for workloads to be implemented by large numbers of virtual machines. Such services are often supported by multiple data centers, which are, in turn, managed collectively by a fabric manager or controller.

Virtual machines deployed in data centers are often homogenously configured to simplify fabric or other management of the cloud computing environment. A homogenous configuration may involve a common operating system for all of the virtual machines. Homogenously configured data centers may be incapable of handling certain workloads that may be presented.

SUMMARY OF THE DISCLOSURE

Methods, systems, and computer program products are directed to managing a workload in a networked computing infrastructure. Such management of the workload may include incorporation of an infrastructure management agent to provision the workload for operation within the networked computing infrastructure. The incorporation may support mobility of the workload within the networked computing infrastructure or between different infrastructures.

In accordance with one aspect of the disclosure, a management agent of a networked computing infrastructure is incorporated into a virtual machine to provision a deployed image of a workload for operation within the networked computing infrastructure. Launch instructions of the virtual machine are modified such that the management agent is invoked during the operation of the virtual machine.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DESCRIPTION OF THE DRAWING FIGURES

For a more complete understanding of the disclosure, reference should be made to the following detailed description and accompanying drawing figures, in which like reference numerals identify like elements in the figures.

While the disclosed systems and methods are susceptible of embodiments in various forms, there are illustrated in the drawing (and will hereafter be described) specific embodiments of the invention, with the understanding that the disclosure is intended to be illustrative, and is not intended to limit the invention to the specific embodiments described and illustrated herein.

DETAILED DESCRIPTION

Methods, systems, and computer program products are described for deployment and other management of workloads via a management agent incorporated into a virtual machine of the workload. The incorporation of the management agent as described herein may allow the management agent to be part of the workload without limiting the mobility of the workload. For instance, such incorporation may avoid baking the management agent into a golden or other image of the workload. By avoiding such modifications to the workload image, the workload may be more easily moved within a networked computing infrastructure or between networked computing infrastructures. The disclosed embodiments may alternatively or additionally be useful in other workload management scenarios not involving workload mobility. For instance, the disclosed embodiments may be used to incorporate a new or updated version of a management agent into the workload. Consequently, a cloud platform may undergo changes that involve an update to the management agent without forcing workloads to be removed, reinstalled, or otherwise taken down from the platform.

The management agent may be configured to provision the workload for deployment within a respective networked computing infrastructure. The management agent may be representative of a specific type of networked computing infrastructure. For instance, a workload deployed within an infrastructure implementing the MICROSOFT WINDOWS AZURE™ cloud platform contains a MICROSOFT WINDOWS AZURE™ management agent. The management agents are often directed to establishing communications between a virtual machine and the cloud or other networked computing infrastructure. The management agents may be tailored or specific to a particular type of cloud or infrastructure in one or more ways. In addition to supporting communications between the virtual machine and the infrastructure, the management agent may make the workload manageable within the infrastructure. A specific management agent packaged as part of a workload image may thus hamper or prevent migration between different types of target sites, clouds, or infrastructures.

With the provisioning techniques of the disclosed embodiments, the workload may be moved regardless of whether the environment established by the infrastructure (e.g., a cloud environment including one or more data centers) is homogenous or heterogeneous. The workload may be moved between different infrastructures regardless of whether the different infrastructures have a common platform.

The workload deployment and management of the disclosed embodiments may be implemented in connection with, a migration of the workload within or between cloud environments, infrastructures, or data centers thereof. The disclosed embodiments may be implemented in utility computing solutions in which, for instance, the capacity of a public cloud is leveraged as a managed extension of a private cloud. The workload may be initially deployed in an enterprise data center of the private cloud. Migration of the workload may subsequently occur when the capacity and/or cost of a public cloud reaches a desired level. In such cases, the disclosed embodiments may automate or otherwise facilitate the migration of the workload from the private cloud (as well as migration to the private cloud). Such migration to/from the private cloud may be based on, for instance, a policy-driven engine or decision in or involving the private cloud. For instance, if there is transient capacity issue in the private cloud, a subset of workloads may be identified for migration to a public cloud. Subsequently, the workloads may be returned to the private cloud when the load conditions are suitable. The disclosed embodiments may enhance the mobility of workloads in these and other scenarios. Workload deployments need not be limited by the management agent to homogenous cloud environments, e.g., those environments implementing a common virtualization platform.

The management agent of the disclosed embodiments is injected or otherwise incorporated into a virtual machine to support the provisioning of the workload for a target site, cloud, or other environment without hampering or otherwise complicating subsequent migration. The disclosed embodiments may facilitate subsequent migration in additional ways. As described below, the workload may be packaged in a virtual or other disk format suitable for transformation to a format compatible with the various target environments.

The management agents of the disclosed embodiments are injected or otherwise incorporated into the virtual machine to provision the virtual machine for operation within the networked computing infrastructure. Such provisioning is achieved without baking the management agent into the image of the workload. As described herein, the management agent may nonetheless be incorporated and invoked during operation of the virtual machine via modifications of launch instructions of the virtual machine. The launch instructions may, for instance, be initialization scripts executed during a launch of the virtual machine. The management agent may thus be installed within the context of the virtual machine, or guest.

Data indicative of the management agent may be transmitted or sent to the virtual machine in a number of ways. In some embodiments, key-value pair (KVP) data is transmitted to the virtual machine to incorporate the management agent. Other transmission mechanisms may be used, including those configured for communication with a running virtual machine. For instance, the management agent data may be injected via dynamically attached storage and/or via a private host/guest network transmission. In some cases, an image, such as an ISO image (e.g., an image file in the .iso format), containing the management agent may be attached to the running virtual machine as a dynamic disk. Code (e.g., a driver) within the virtual machine may mount the disk and transfer control to the agent executable within the ISO image. Other communication or transmission mechanisms may be used. For example, instead of using the disk as a mechanism for injecting the agent into the virtual machine, networked communication may be used to inject the agent code into the virtual machine.

The management agent may be incorporated into the virtual machine at or during deployment (e.g., at the point of deploying the workload). The provisioning of the workload via the management agent may be "just in time" or concurrent with the deployment. Such just-in-time provisioning may inject a provisioning state or provisioning information appropriate for the environment or other aspect of the infrastructure in which the workload is being deployed. In some cases, the management agent is incorporated into a running virtual machine. Alternatively or additionally, the workload may be provisioned as part of, or during, the workload deployment. For instance, in some embodiments, data indicative of the management agent is provided via a provisioning configuration document or other item of a deployment package. Such just-in-time provisioning allows a golden image of the workload to remain unmodified. Subsequent deployments of the workload need not involve manual removals or modification of management agent code or data. Notwithstanding the foregoing, the timing of such provisioning may vary. For instance, some provisioning acts may be implemented before deployment. In one example, disk image format transformation occurs before deployment. Other provisioning, including, e.g., the incorporation of the management agent, may then occur while the workload is deployed or otherwise as part of deployment at a target site.

The "just-in-time" provisioning of the disclosed embodiments may be extended to address a variety of aspects of provisioning. The incorporation of the management agent may be implemented in connection with other provisioning. In some cases, additional provisioning information is passed to the virtual machine with the management agent.

Notwithstanding references herein to various commercially available networked computing infrastructures or environments, cloud platforms, hypervisor or other host software products, and other virtualization software products, the disclosed embodiments are not limited to any particular type of infrastructure, environment, platform, host, or other virtualization product. The disclosed embodiments may instead support the mobility of workloads between disparate infrastructures, environments, platforms, hosts, and other virtualization entities.

Figure 1:
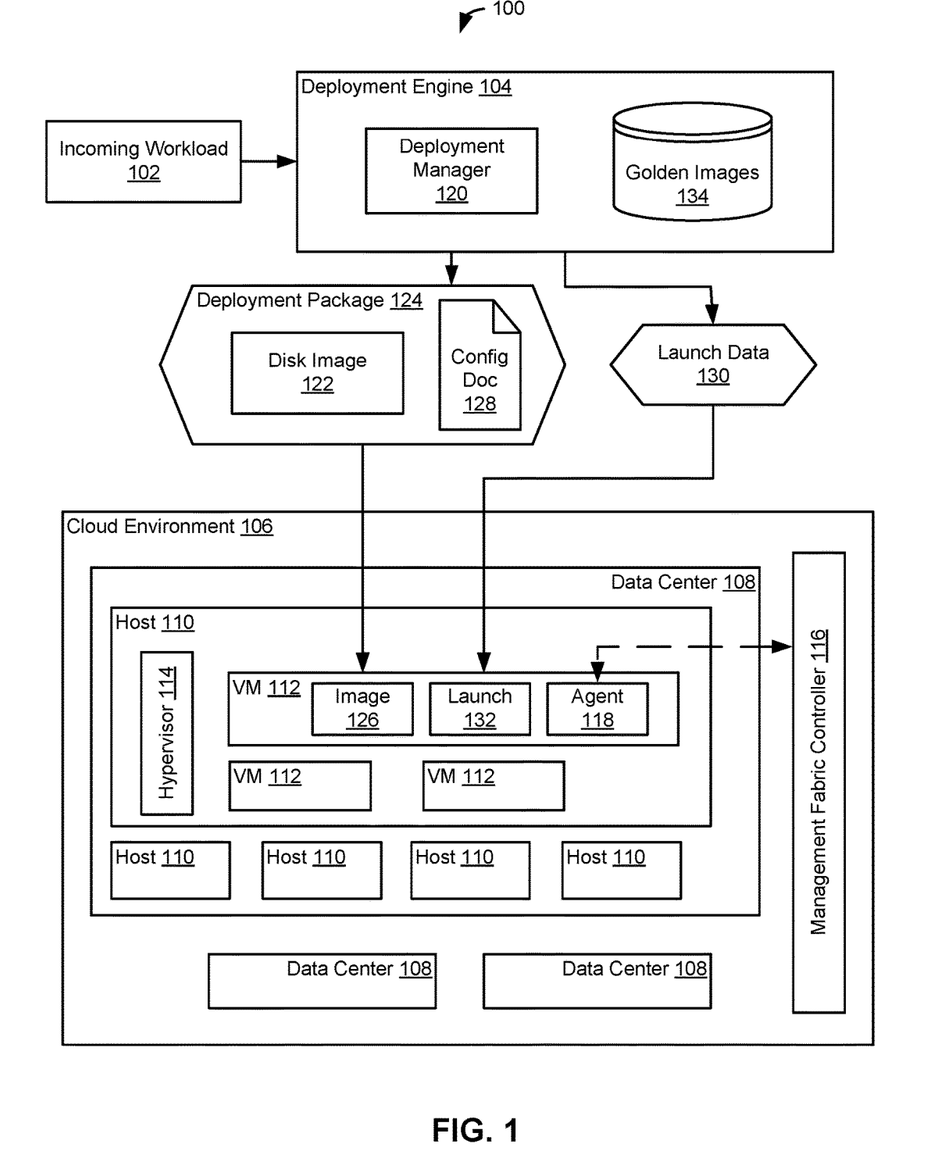
FIG. 1 is a block diagram of an exemplary system configured for managing and deploying a workload in accordance with one embodiment.

FIG. 1 depicts a system 100 in which a workload 102 is deployed. In this example, the system 100 includes a deployment engine 104 and a cloud environment 106. The deployment engine 104 is configured to support the deployment of the workload 102 on or within the cloud environment 106. In some embodiments, the cloud environment 106 may be configured as a MICROSOFT WINDOWS AZURE™ infrastructure. The cloud environment 106 may correspond with or include any type of environment or networked computing infrastructure within which the workload 102 may be deployed. The system 100 may include additional, fewer, or alternative subsystems or components. For instance, one or more aspects of the deployment engine 104 may be integrated with, or implemented as a part of, the cloud environment 106.

The workload 102 may be an incoming workload provided by an external system, environment, networked computing infrastructure, or other computing system. For example, the workload 102 may have previously been deployed on a private cloud run by an enterprise-owner of the workload 102. A decision to deploy the workload 102 within the cloud environment 106 may be made by an external computing system associated with the enterprise. The enterprise may decide to deploy the workload 102 upon receiving data indicative of excess or available processing capacity within the cloud environment 106. Alternatively or additionally, the deployment engine 104 may be configured to implement an analysis of processing capacity and/or make deployment and/or other decisions regarding the workload 102.

The cloud environment 106 may be a public or other cloud environment. In this example, the networked computing infrastructure of the cloud environment 106 includes a number of data centers 108, each including a collection of computing systems or devices configured as host computers 110. The host computers 110 may be configured as server computers. Each data center 108 may include or provide a respective server farm providing cloud computing services. The number and configuration of data centers 108 may vary. For example, some of the data centers 108 may be homogenous in one or more respects (e.g., with uniformly configured host computers 110, common virtualization software, etc.), while others may be heterogeneous in one or more respects.

One of the data centers 108 is shown in greater detail. In this example, the data center 108 includes five host computers 110. The number of host computers 110 may vary. The host computers 110 may provide a variety of different cloud computing services to users of the cloud environment 106. Each host computer 110 runs a number of virtual machines 112 to provide such cloud computing services. The virtual machines 112 of each host computer 110 may run different operating systems.

Each host computer 110 may include a hypervisor 114 or virtualization manager to manage the relationship between the hardware resources of the host computer 110 and the virtual machines 112. The hypervisor 114 may manage the physical hardware of the host computer 110 in connection with data partitioning, physical node definitions, and other aspects of the virtual machines 112. The configuration of the hypervisor 114 may vary. The hypervisor 114 may be a MICROSOFT® HYPER-V hypervisor, a CITRIX XEN hypervisor, or any other commercially available hypervisor.

The configuration of the host computers 110 may vary. The host computers 110 may have varying hardware configurations, as well as varying software and/or firmware configurations. For example, the host computers 110 may be configured with different operating systems.

The networked computing infrastructure of the cloud environment 106 includes one or more management fabric systems or controllers 116 that monitor and manage the physical and/or virtual computers deployed within the cloud environment 106. The management fabric controller 116 may manage a number of different functions, including, for instance, patching the computers, standing up a computer, including installing applications on the computer, and instantiating those applications (such as a MICROSOFT® Server App-V application virtualization package, or a MICROSOFT® Database Application Components description of a database), and/or monitoring the health of the computers. In this example, the management fabric controller 116 may manage the operation of the data centers 108, the host computers 110, and/or the virtual machines 112. In some embodiments (e.g., those having only a single data center), the cloud environment 106 includes a management controller at the data center level rather than a management fabric controller. The disclosed methods and systems may be useful in connection with various types of management controllers.

Further details regarding the management of cloud environments at the data center and host machine levels are set forth in the following patent publications, the entire disclosures of which are hereby incorporated by reference: U.S. Patent Pub. No. 2011/0035754 ("Workload management for heterogeneous hosts in a computing system environment"); U.S. Patent Pub. No. 2011/0041126 ("Managing workloads in a virtual computing environment"); U.S. Patent Pub. No. 2011/0126197 ("System and method for controlling cloud and virtualized data centers in an intelligent workload management system"); and U.S. Patent Pub. No. 2012/0204187 ("Hybrid cloud workload management").

The management fabric controller 116 provides the management functions by interacting with a corresponding management agent 118 on each physical computer (e.g., the host computer 110) or each virtual machine 112. In this example, each virtual machine 112 includes a respective management agent 118. The management agents 118 may act as a proxy for the management fabric controller 116. The management agent 118 is configured in accordance with the type of cloud or other environment of the networked computing infrastructure. For example, the management agent 118 may be configured as a MICROSOFT® WINDOWS AZURE™ agent in embodiments in which the cloud environment 106 is a MICROSOFT® WINDOWS AZURE™ environment. Each management agent 118 may be configured to establish and/or support communications between the management fabric controller 116 and the virtual machine 112. For example, the management agent 118 may collect help information, provide location information, address alerts or failures, and/or facilitate the redeployment of the image elsewhere (e.g., on a different physical machine) as a result of such alerts or failures. The management agents 118 may support the management of the workload 102 within the networked computing infrastructure in these and/or other ways.

In the embodiment of FIG. 1, the management agents 118 are incorporated into the virtual machines 112 via the deployment engine 104. In this example, the deployment engine 104 includes a deployment manager 120 for managing the workload 102 in connection with the networked computing infrastructure. The deployment manager 120 may include software instructions for deploying the workload 102 and provisioning the virtual machine 112 in which the workload 102 is deployed. The deployment and provisioning instructions may be arranged in respective modules or integrated to any desired extent. The deployment manager 120 or the deployment engine 104 may include a memory or other computer-readable storage media (see, e.g., the embodiment of FIG. 4) having the deployment and provisioning instructions stored thereon for execution by a processor of, for example, the deployment engine 104.

The deployment manager 120 may execute the deployment instructions to deploy image data 122 of the workload 102 in connection with the creation of one of the virtual machines 112. The deployment manager 120 may select one of the host computers 110 as a target for the deployment. The virtual machine 112 may be created via or supported by various virtualization techniques or technologies.

In the embodiment of FIG. 1, the image data 122 is delivered to the target host computer 110 in a deployment package 124. The image data 122 may be or include a disk image of the workload 102 configured in a disk format compatible with the target host computer 110 and/or the operating system of the virtual machine 112. The image data 122 may then be copied or otherwise used to create or otherwise deploy an image 126 (e.g., a disk image) of the workload 102 for the virtual machine 112.

Code or data indicative of the management agent 118 of the networked computing infrastructure may be incorporated into the virtual machine 112 as part of the provisioning process. The deployment manager 120 may execute the provisioning instructions to incorporate the management agent 118 to provision the virtual machine 112 for operation within the networked computing infrastructure of the cloud environment 106. As a provisioning element, the management agent 118 may thus not be a persistent component of the workload 102. In some cases, the management agent 118 is installed or injected as a last step in the deployment procedure. In the embodiment of FIG. 1, data indicative of the management agent 118 may be delivered via a provisioning configuration document 128 of the deployment package 124. The provisioning configuration document 128 may be an Extensible Markup Language (XML) or other tagged data envelope. Once the provisioning configuration document 128 and the image data 122 are received at the host computer 110, the hypervisor 114 and/or other software or system components may use the provisioning data and the image data to set up and/or start the virtual machine 112.

The provisioning configuration document 128 may include a set of provisioning parameters for the virtual machine 112. The nature of the provisioning parameters may vary. For example, the parameters in the provisioning configuration document 128 may specify various hardware requirements (e.g., processor capacity, memory capacity), system specifications, etc. Code or data specifying the management agent 118 may be set forth as one or more parameters specified in the provisioning configuration document 128. The provisioning configuration document 128 may include one or more fields in which the management agent data is specified. Alternatively, the management agent data or code may be specified via one or more extensions to a pre-existing configuration document format. For example, a number of key-value pair (KVP) or other attribute-value pair data representations may extend the configuration document data structure to provide a framework in which the code specifying the management agent 118 may be set forth. The KVP data may present one or more key/value tuples. A given key and its value may include or present several hundred bytes of data. A file transfer protocol may be constructed based on the KVP functionality.

The provisioning configuration document 128 may be delivered with the image 122 in other ways. For example, the provisioning configuration document 128 need not be packaged with the image 122. The deployment engine 104 may send one or more additional deployment packages or data transmissions to the host computer 110.

The data indicative of the management agent 118 may be delivered to the virtual machine 112 via other techniques. A configuration document need not be used to incorporate the management agent data into the virtual machine 112. In the embodiment of FIG. 1, the data indicative of the management agent 118 may be alternatively or additionally sent to the virtual machine 112 via a data transmission separate from the deployment package 124. A separate transmission may be useful in connection with scenarios or embodiments in which the deployment package 124 has already been sent, and/or scenarios or embodiments in which the virtual machine 112 is already running. In this example, the deployment engine 104 sends KVP data via a launch data transmission 130. The launch data transmission 130 may include the management agent data in a KVP or other format. The KVP mechanism may be used independent or regardless of the run state of the virtual machine 112.

The provisioning instructions may direct the deployment manager 120 to take additional steps to provision the virtual machine 112 with the management agent 118. The deployment manager 120 may execute the provisioning instructions to modify launch instructions of the virtual machine 112 such that the management agent 118 is invoked during the operation of the virtual machine 112. The launch instructions may be modified in accordance with an operating system type of the workload 102 and/or image 122 to ensure the invocation of the management agent 118. In this example, the launch data transmission 130 from the deployment manager 120 is directed to configuring or modifying an initialization or other launch module 132 of the virtual machine 112. For instance, the launch data transmission 130 may include launch script or other data or instructions to be incorporated into the launch module 132. The script, data, or instructions may be in addition or alternative to the KVP data, as described above.

In some embodiments, the launch data transmission 130 includes one or more initialization instructions configured to be inserted into initialization scripts (e.g., init scripts) of the launch module 132. The initialization scripts and/or launch module 132 may be associated with, or specific to, an operating system of the virtual machine 112. For example, the operating system of the virtual machine 112 may have a boot script implemented during startups or reboots.

The launch data transmission 130 may be configured to insert the initialization scripts in a variety of known locations within the virtual machine 112. For example, in a Linux scenario, the script may be placed under the /etc/init.d directory. The scripts under that directory are directly invoked during the boot of the system. Other boot script may be modified at a position appropriate for startup or reboot of the operating system to ensure that the management agent 118 is invoked upon startup or a reboot. Once modified by the launch data or instructions, executing the launch module 132 is used to invoke the management agent 118 within the virtual machine 112. The management agent 118 may then be invoked upon the implementation (or re-implementation) of the initialization scripts.

The location at which the initialization scripts are inserted need not involve startup or reboot scripts of the operating system. For example, the management agent 118 may be invoked via scripts directed to launching or initializing a feature of, or associated with, the operating system.

The management agent data may be set forth in the launch data transmission 130 in a KVP framework. Other frameworks, formats, or data structures may be used. The launch data transmission 130 may thus provide a mechanism to incorporate the management agent data into the virtual machine 112 even if the virtual machine 112 is already running.

Other transmission mechanisms or techniques may be used to provision a running virtual machine with the management agent data. For example, the deployment engine 104 may dynamically attach a disk or other data store to the virtual machine 112. The management agent data may be incorporated into the virtual machine 12 by temporarily mounting or otherwise accessing the dynamically attached data store to obtain the management agent data stored therein. In other embodiments, a private host-guest network may be used to incorporate the management agent data into the virtual machine into a specified location in the virtual machine (or guest). Other techniques for communicating with a running guest or virtual machine (e.g., to inject a script for the management agent data into a specified location) may be used.

The above-described provisioning with the management agent data may be implemented during the deployment of the workload 102. The management agent 118 may thus be incorporated just-in-time or at the point of deployment. While the incorporation of the management agent 118 may be concurrent with the deployment, the incorporation need not modify the image 126 of the virtual machine 112. Through the above-described provisioning, the management agent 118 may reside within the virtual machine 112 separately from the image 126, but be nonetheless invoked during operation.

The separation of the image 126 and the management agent 118 within the virtual machine 112 may allow the workload 102 to be re-deployed or moved within the cloud environment 106 or to a new cloud environment without a manual modification of the image 126. Updating the management agent 118 for compliance with a new version of, or other changes within, the cloud environment 106 may also be achieved without such manual modifications. The update may occur without taking down the workload 102. For example, the new management agent 118 may be provided via a transmission such as the launch data transmission 130. The image 126 may remain untouched during the update.

The above-described management agent provisioning need not be implemented by the deployment manager 120 or other component or entity of the deployment engine 104. For example, another component within the networked computing infrastructure of the cloud environment 106 may direct such provisioning.

Additional or alternative techniques for installing the management agent within the context of the guest may be used. For example, a KVP framework may be used. In some embodiments, agent invocation may be achieved by placing the agent (and/or a reference thereto) in an appropriate location within the virtual machine (or guest), e.g., under the /etc/init.d directory, and by having the agent executed as part of the boot sequence.

The deployment engine 104 may also include a data store 134 in which image data for the workload 102 is stored. The image data may correspond with a golden image of the workload 102. Storing the golden image separately from the virtual machine 112 in which the workload 102 is deployed may also facilitate workload mobility. The deployment manager 120 may store a copy of the workload image during the preparation of the image 122 and/or the deployment package 124. The golden or other copy of the image data may be stored elsewhere within the system 100 or the cloud environment 106. For example, a golden image may be stored on a memory of the host computer 110 on which the virtual machine 112 is running. Notwithstanding the foregoing, the system 100 need not store the golden image of the workload 102.

The deployment engine 104 and/or the deployment manager 120 may be further configured for transformation of a virtual disk format in which the workload 102 is packaged or contained. In one embodiment, the deployment engine 104 includes disk transformation instructions stored in a memory thereof for execution by a processor thereof to transform a disk format of the workload 102 into a disk format compatible with the target host computer system 110. The workload 102 may arrive in any one of a variety of different formats, including, for instance, virtual disk formats such as VHD (MICROSOFT® virtualization environments), VMDK (VmWare virtualization environments), as well as raw and QCOW disk formats.

In some embodiments, the workload 102 may be configured in accordance with a virtual disk format having metadata to facilitate or support the transformation. For example, the Open Virtualization Format (OVF) is a packaging standard that adds additional metadata for hardware provisioning, virtual disk encoding, etc. The metadata may be used to implement the transformation. Other packaging standards for virtual machines may be used. The deployment engine 104 may use data other than metadata to transform the workload image from the virtual disk format into a disk format compatible with the target host computer system 110.

The metadata or other data provided via the incoming workload 102 may be used to determine one or more characteristics of the workload deployment. From the characteristic(s), a type of workload may be identified by the deployment manager 120 to guide the above-described provisioning. The provisioning instructions implemented by the deployment manager 120 may be configured to implement an analysis of the metadata to determine how best to incorporate and/or give life to the management agent 118 within the virtual machine 112. For example, if the metadata indicates that the workload 102 is configured for operation within a MICROSOFT WINDOWS® operating system, then the deployment manager 120 may use that indication to determine an appropriate location within the launch module 132 at which to insert launch or initialization instructions for invoking the management agent 118. The operating system identification may also be used to determine the content of the launch or initialization scripts to be inserted. An indication of a different operating system (e.g., Linux) may guide the deployment manager 120 to configure and insert the launch or initialization scripts accordingly.

Figure 2:
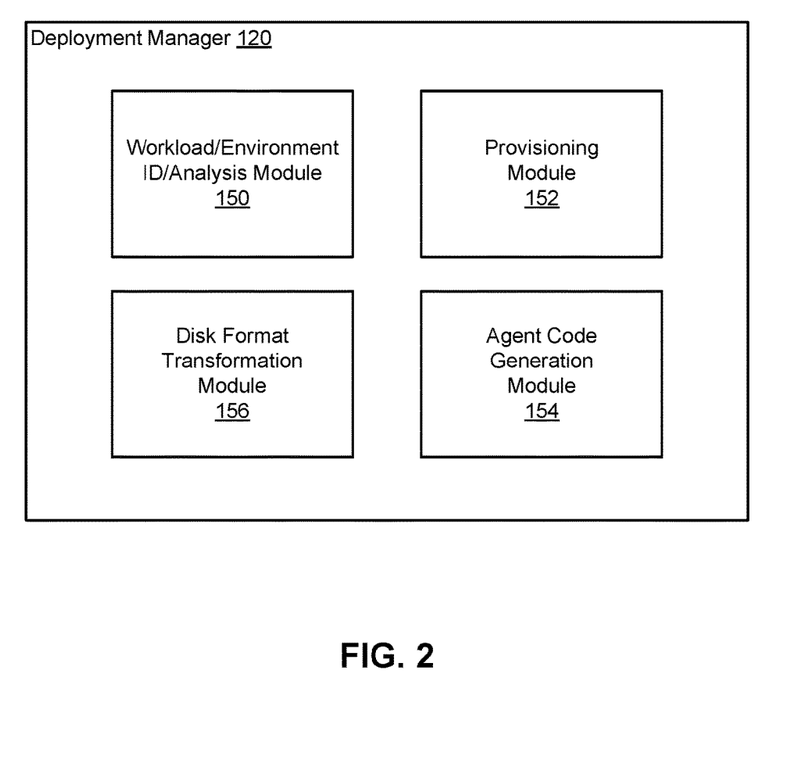
FIG. 2 is a block diagram of a deployment manager of the system of FIG. 1.

FIG. 2 depicts the deployment manager 120 in greater detail. The deployment manager 120 includes a number of modules directed to implementing the functions described herein. Each module may include respective instructions stored on computer-readable media and executed by a processor of the deployment manager 120 (or the deployment engine 104 (FIG. 1)). In this example, the deployment manager 120 includes an analysis module 150, a provisioning module 152, an agent code generation module 154, and a disk format transformation module 154. The modules (and/or the instructions thereof) may be integrated to any desired extent.

The analysis module 150 may be implemented to determine the workload operating system and cloud environment to support the management agent provisioning and other processes. For instance, the provisioning module 152 may determine one or more provisioning parameters based on one or both of the identifications. Some provisioning parameters, such as the launch or initialization instructions, may be based on the operating system type. The agent code generation module 154 may configure the code or data of the management agent in accordance with the identified cloud environment to ensure that the management agent is compatible with the management fabric controller 116 (FIG. 1). The disk format transformation module 156 may use the operating system identification to transform the disk image into an appropriate disk format.

The analysis module 150 of the deployment manager 120 may analyze one or more other aspects of the incoming workload 102 to identify, receive, determine, or otherwise obtain data indicative of the type of operating system for the workload image. In some cases, the analysis module 150 is directed to analyzing the metadata of a package in which the workload image is provided. The analysis may be directed to alternative or additional aspects of the workload image.

The analysis module 150 may alternatively or additionally be configured for other analysis. For example, the analysis module 150 may analyze one or more components of the system 100 (FIG. 1) to identify, receive, determine, or otherwise obtain data indicative of the type of cloud environment in which the workload will be deployed. In some cases, the analysis module 150 may identify the type of hypervisor 114 and/or other aspect of the virtualization environment of the target host computer 110 (FIG. 1). Alternatively or additionally, the analysis module 150 may identify the type of cloud environment via communication with the management fabric controller 116 (FIG. 1).

In this embodiment, the agent code generation module 154 may then use the data obtained by the analysis module 150 regarding the cloud environment to generate the management agent code or data. The provisioning module 152 may include instructions directed to the incorporation of the management agent data as described above. The provisioning module 152 may further include instructions directed to modifying the launch instructions in accordance with the operating system type obtained by the analysis module 150 such that the management agent is invoked as described above.

Figure 3:
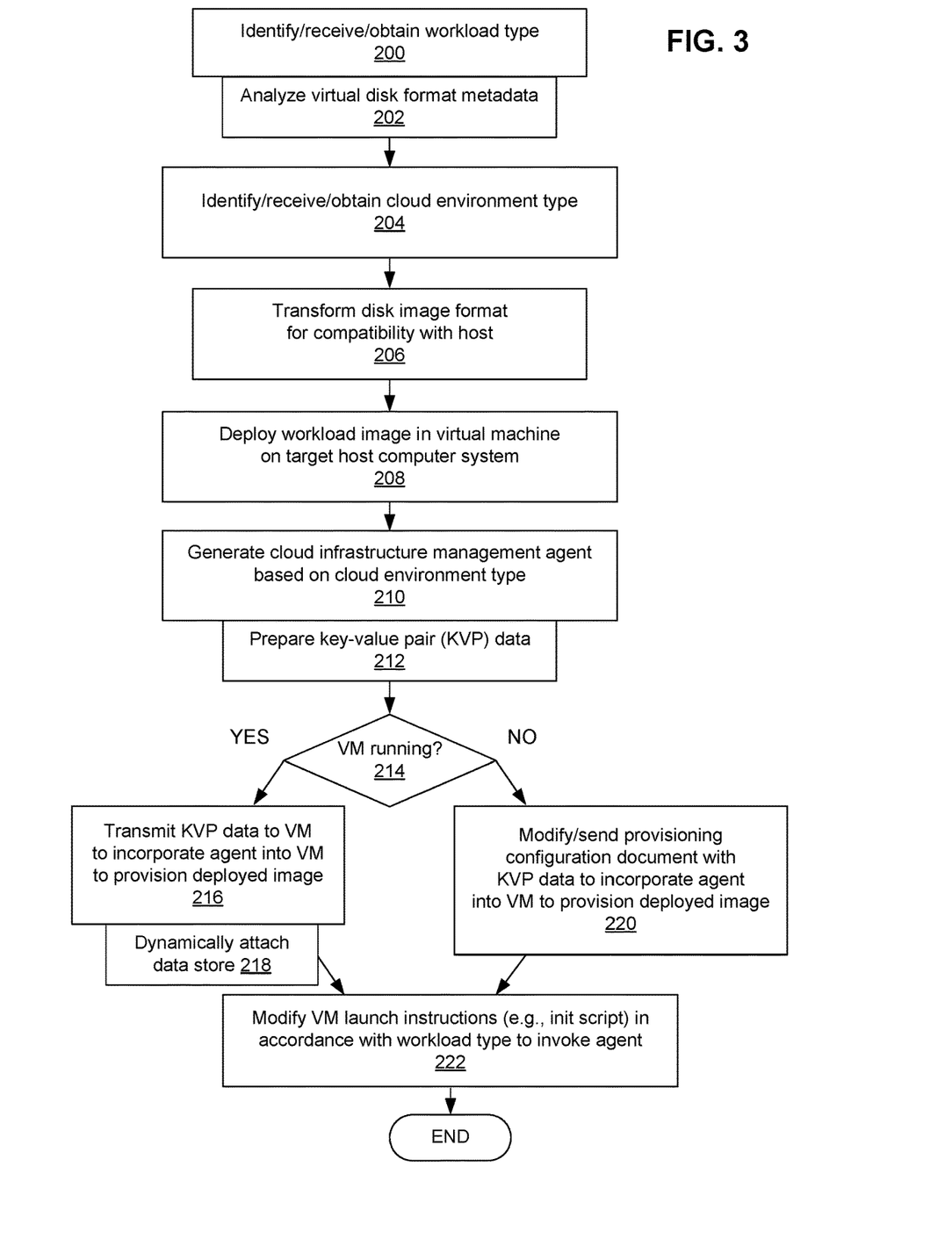
FIG. 3 is a flow diagram of an exemplary computer-implemented method for managing and deploying a workload in accordance with one embodiment.

FIG. 3 depicts an exemplary method for managing a workload in connection with a networked computing infrastructure such as the one described above. The method is computer-implemented. For example, the deployment manager 120 shown in FIG. 1 may be configured to implement one or more of the acts of the method. The implementation of each act may be directed by respective computer-readable instructions executed by a processor of the deployment manager 120 and/or another processor or processing system.

In some cases, the method may begin with any number of acts directed to receiving an incoming workload to be deployed. The incoming workload may be received or obtained in a variety of ways. Data indicative of a workload image may be received with or without additional data and/or instructions regarding the deployment. Alternatively, the workload management acts of the method are directed to a currently deployed workload.

In the embodiment of FIG. 3, the method begins with an act 200 in which data indicative of an operating system type of the workload is acquired or otherwise obtained. In some embodiments, the type of operating system may be identified by a disk format analysis in an act 202. The analysis may be directed to locating an operating system or other characteristic in metadata of a disk image container in which the workload image is packaged. The operating system type may be identified via other types of analyses of the workload image. Information indicative of the operating system type may be obtained in other ways (e.g., not involving analyses of the workload image). For example, the incoming workload may be received along with data identifying or specifying the operating system type.

In act 204, data indicative of a type of environment (e.g., cloud environment) for the networked computing infrastructure is acquired or otherwise obtained. The environment type data may be obtained via communications with a management fabric controller or other component of the networked computing infrastructure. Information indicative of the cloud environment type may be obtained in other ways (e.g., not involving communications with the infrastructure). For example, in a scenario involving an update to a management agent, data indicative of the characteristics of a preexisting deployment of the workload may be accessed to determine the environment type.

The disk format of the workload image may be transformed in an act 206. Both the initial and final disk formats may vary. In some cases, the initial and/or final disk format may be a virtual disk format, as described above. The disk format transformation may be implemented based on the data indicative of the workload type (e.g., operating system). For example, the disk image may be transformed into a format compatible or otherwise suitable for the operating system of the virtual machine. The transformation may be based on additional information, such as the cloud environment type and/or a characteristic(s) of the target host computer system.

With the disk format of the image compatible with the virtual machine, the workload image (e.g., a disk image) may be deployed in a virtual or guest machine on a target host computer in an act 208. The workload image may be deployed without a management agent baked or otherwise integrated therein, as described above. The deployment may include transmitting a deployment package including one or more components in addition to the workload image, such as a configuration document, as described above. In some cases, the configuration document may be transmitted separately from the workload image. Separate transmission may allow the configuration document to be extended to include management agent data, as described above. Alternatively, the act 208 may be implemented concurrently or after the management agent data is generated (or otherwise available) and inserted into the configuration document.

In this embodiment, an infrastructure management agent is generated in an act 210 after the image deployment. The infrastructure management agent is generated based on the cloud environment type data. In some cases, the generation of the infrastructure management data includes preparation in an act 212 of KVP data indicative of the management agent data. Other representations of the management agent data or code may be prepared and used.

The order in which the infrastructure management agent generation and other workload deployment acts are implemented may vary. For example, the act 210 may be implemented at other times subsequent to the acquisition of the environment type data in the act 204. The infrastructure management agent data may thus be generated before workload deployment (act 208). In such cases, the workload image and management agent data may be sent to the virtual machine concurrently.

The nature of the act 210 may vary. In some cases, the infrastructure management agent data or code may already be generated or otherwise available. For example, some or all of the management agent data or code may have been generated in connection with a previous deployment of the workload. The act 210 may thus instead be directed to modifying preexisting data or code for the infrastructure management agent.

In this embodiment, a determination is made in a decision block 214 as to whether the virtual machine is currently running. The virtual machine may already be running due to a previous deployment. For example, the method may be directed to updating a management agent for a prior deployment of the workload. Alternatively, the virtual machine may be running as a result of the prior implementation of the act 208 in which the workload image was sent to the virtual machine. The manner in which the management agent is incorporated into the virtual machine may be based on the status determination regarding whether the virtual machine is running. Alternatively, the management agent is incorporated into the virtual machine without the status determination.

If the virtual machine is running, control passes to an act 216 in which the management agent is transmitted to the virtual machine to provision the virtual machine for operation within the networked computing infrastructure. The characteristics of the transmission may vary. In the embodiment of FIG. 3, the transmission includes dynamically attaching a data store (e.g., a disk, such as a DVD data set) is stored to the host computer in an act 218. Other transmission mechanisms may be used. For example, a network connection with the host computer may be established. The management agent data in the data store or other transmission may be arranged in a KVP framework or other data structure.

If the virtual machine is not running, the KVP or other management agent data may be sent to the virtual machine in an act 220 via a configuration document. The act 220 may include a modification of the configuration document to insert and/or present the KVP or other data structure(s). The configuration document may be sent via a deployment package provided to the target host computer system, as described above. The act 220 may thus be implemented concurrently with the act 208 in some embodiments.

In the embodiment of FIG. 3, launch instructions of the virtual machine are modified in an act 222 after the management agent is incorporated into the virtual machine. The modifications are made in accordance with the workload type data, as described above, such that the management agent is invoked during the operation of the virtual machine. The launch instructions may include or correspond with an initialization script of an operating system of the workload. The act 222 may be implemented at other times in the method, e.g., after the workload type data is available or otherwise obtained.

The order of the acts of the method may vary in addition to those variations identified above. For example, the management agent data or code may be generated before the workload deployment and/or the disk format transformation. The management agent data incorporation may be implemented concurrently with the image deployment. In other cases, the incorporation may be implemented after the deployment.

Figure 4:
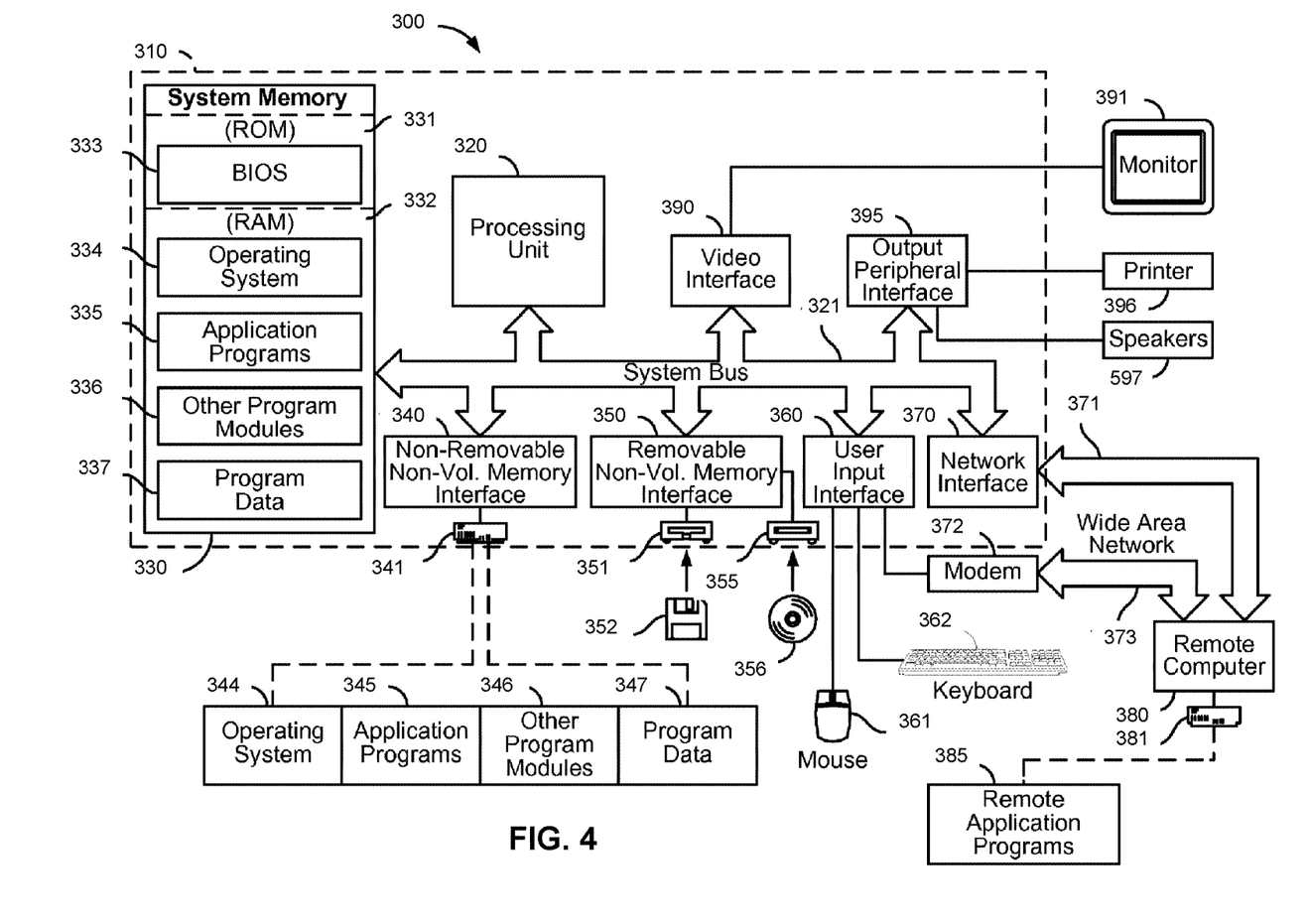
FIG. 4 is a block diagram of a computing environment in accordance with one embodiment for implementation of one or more of the disclosed methods and systems.

With reference to FIG. 4, an exemplary computing environment 300 may be used to implement one or more aspects or elements of the above-described methods and/or systems. The computing environment 300 of FIG. 4 may be used by, or incorporated into, one or more elements of the system 100 (FIG. 1). For example, the computing environment 300 may be used to implement the deployment engine 104, the deployment manager 120, the target host computer 110, and/or the management fabric controller 116. The computing environment 300 may be used or included as a client, network server, application server, or database management system or other data store manager, of any of the aforementioned elements or system components. The computing environment 300 may be used to implement one or more of the acts described in connection with FIG. 3.

The computing environment 300 includes a general-purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The units, components, and other hardware of computer 310 may vary from the example shown.

Computer 310 typically includes a variety of computer readable storage media configured to store instructions and other data. Such computer readable storage media may be any available media that may be accessed by computer 310 and includes both volatile and nonvolatile media, removable and non-removable media. Such computer readable storage media may include computer storage media as distinguished from communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may accessed by computer 310.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 4 illustrates operating system 334, application programs 335, other program modules 336, and program data 337. For example, one or more of the application programs 335 may be directed to implementing the analysis module 150 (FIG. 2), the provisioning module 152 (FIG. 2), the agent code generation module 154 (FIG. 2), the disk format transformation module 156, and/or one or more of the other instruction sets described above. Alternatively or additionally, one or more of the modules or the instruction sets may be implemented via one or more of the other program modules 336. In this or another example, any one or more the instruction sets in the above-described memories or data storage devices may be stored as program data 337.

Any one or more of the operating system 334, the application programs 335, the other program modules 336, and the program data 337 may be stored on, and implemented via, a system on a chip (SOC). Any of the above-described modules may be implemented via one or more SOC devices. The extent to which the above-described modules are integrated in a SOC or other device may vary.

The computer 310 may also include other removable/non-removable, volatile/nonvolatile computer storage media. By way of example only, FIG. 4 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 4, provide storage of computer readable instructions, data structures, program modules and other data for the computer 310. For example, hard disk drive 341 is illustrated as storing operating system 344, application programs 345, other program modules 346, and program data 347. These components may either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 310 through input devices such as a keyboard 362 and pointing device 361, commonly referred to as a mouse, trackball or touch pad. Other input devices (not shown) may include a microphone (e.g., for voice control), touchscreen (e.g., for touch-based gestures and other movements), ranger sensor or other camera (e.g., for gestures and other movements), joystick, game pad, satellite dish, and scanner. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 395.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 3. The logical connections include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. FIG. 4 illustrates remote application programs 385 as residing on memory device 381. The network connections shown are exemplary and other means of establishing a communications link between the computers may be used.

The computing environment 300 of FIG. 4 is only one example of a suitable computing environment and is not intended to suggest any limitation as to the scope of use or functionality of the technology herein. Neither should the computing environment 300 be interpreted as having any dependency or requirement relating to any one or combination of components illustrated in the exemplary operating environment 300.

The technology described herein is operational with numerous other general purpose or special purpose computing system environments or configurations. Examples of well-known computing systems, environments, and/or configurations that may be suitable for use with the technology herein include, but are not limited to, personal computers, server computers (including server-client architectures), hand-held or laptop devices, mobile phones or devices, multiprocessor systems, microprocessor-based systems, set top boxes, programmable consumer electronics, network PCs, minicomputers, mainframe computers, distributed computing environments that include any of the above systems or devices, and the like.

The technology herein may be described in the general context of computer-executable instructions, such as program modules, being executed by a computer. Generally, program modules include routines, programs, objects, components, data structures, and so forth that perform particular tasks or implement particular abstract data types. The technology herein may also be practiced in distributed computing environments where tasks are performed by remote processing devices that are linked through a communications network. In a distributed computing environment, program modules may be located in both local and remote computer storage media including memory storage devices.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. A computer-implemented method for managing a workload in connection with a networked computing infrastructure comprising a plurality of host computer systems, the method comprising:
    obtaining data indicative of an environment type of the networked computing infrastructure;
    deploying, with a processor, an image of the workload in a virtual machine on a target host computer system of the plurality of host computer systems, the image not having management agent data of a baked-in management agent integrated therein while the image is deployed; and
    incorporating a management agent of the networked computing infrastructure into the virtual machine to provision the virtual machine for operation within the networked computing infrastructure, the management agent being configured in accordance with the data indicative of the environment type;

wherein the management agent is configured to establish communications between the virtual machine and the networked computing infrastructure.

2. The computer-implemented method of claim 1, wherein, after incorporating the management agent, the management agent resides within the virtual machine separately from the image.

3. The computer-implemented method of claim 1, wherein incorporating the management agent comprises injecting the management agent into the virtual machine while the virtual machine is running.

4. The computer-implemented method of claim 1, wherein incorporating the management agent is implemented in connection with provisioning of the virtual machine.

5. The computer-implemented method of claim 1, wherein incorporating the management agent comprises providing management agent data to the virtual machine via a provisioning configuration document.

6. The computer-implemented method of claim 5, wherein the provisioning configuration document is part of a deployment package provided to the target host computer system in connection with deploying the image of the workload.

7. The computer-implemented method of claim 5, wherein the provisioning configuration document and the image of the workload are transmitted separately to the virtual machine.

8. The computer-implemented method of claim 1, wherein incorporating the management agent is implemented concurrently with deploying the image of the workload.

9. The computer-implemented method of claim 1, wherein the management agent comprises code configured to support communications between the virtual machine and a management fabric controller of the networked computing infrastructure.

10. A system for managing a workload in connection with a networked computing infrastructure comprising a plurality of host computer systems, the system comprising:
   a memory in which deployment instructions and provisioning instructions are stored; and
   a processor coupled to the memory and configured to execute the deployment instructions to deploy an image of the workload in a virtual machine on a target host computer system of the plurality of host computer systems, the image not having management agent data of a baked-in management agent integrated therein while the image is deployed;
   wherein the processor is further configured to execute the provisioning instructions to incorporate a management agent of the networked computing infrastructure into the virtual machine to provision the virtual machine for operation within the networked computing infrastructure, the management agent being configured in accordance with an environment type of the networked computing infrastructure;
   wherein the management agent is configured to establish communications between the virtual machine and the networked computing infrastructure.

11. The system of claim 10, wherein the management agent resides within the virtual machine separately from the image after incorporation into the virtual machine.

12. The system of claim 10, wherein the management agent is incorporated while the virtual machine is running.

13. The system of claim 10, wherein the management agent is provided to the virtual machine via a provisioning configuration document.

14. The system of claim 13, wherein the provisioning configuration document is part of a deployment package provided to the target host computer system in connection with deploying the image of the workload.

15. The system of claim 10, wherein the management agent is incorporated concurrently with deployment of the image of the workload.

16. The system of claim 10, wherein the management agent comprises code configured to support communications between the virtual machine and a management fabric controller of the networked computing infrastructure.

17. A computer program product for implementing a method of managing a workload, the computer program product comprising one or more computer-readable storage media having stored thereon computer-executable instructions that, when executed by one or more processors of a computing system, cause the computing system to perform the method, the method comprising:
   obtaining data indicative of an environment type of a networked computing infrastructure;
   deploying an image of the workload in a virtual machine on a target host computer system of the plurality of host computer systems, the image being deployed without management agent data of a baked-in management agent integrated therein;
   incorporating a management agent of the networked computing infrastructure into the virtual machine to provision the virtual machine for operation within the networked computing infrastructure, the management agent being configured in accordance with the data and operative to configure the virtual machine to support communications between the virtual machine and a management system of the networked computing infrastructure;
   wherein the management agent is configured to establish communications between the virtual machine and the networked computing infrastructure.

18. The computer program product of claim 17, wherein, after incorporating the management agent, the management agent resides within the virtual machine separately from the image.

19. The computer program product of claim 17, wherein incorporating the management agent is implemented concurrently with deploying the image of the workload.

20. The computer program product of claim 17, wherein incorporating the management agent comprises injecting the management agent into the virtual machine while the virtual machine is running.

* * * * *